United States Patent

Ueda et al.

[11] 4,193,676
[45] Mar. 18, 1980

[54] DATA PHOTOGRAPHIC DEVICE FOR CAMERA

[75] Inventors: Hiroshi Ueda, Nara; Mitsuru Saito, Kaizuka; Yasuhiro Nanba, Osaka; Yoshio Kuramoto, Toyonaka, all of Japan

[73] Assignee: Minolta Camera Kabushiki Kaisha, Osaka, Japan

[21] Appl. No.: 922,406

[22] Filed: Jul. 6, 1978

[30] Foreign Application Priority Data

Jul. 6, 1977 [JP] Japan .................. 52-89880[U]
Jul. 6, 1977 [JP] Japan .................. 52-89881[U]
Jul. 6, 1977 [JP] Japan .................. 52-89882[U]

[51] Int. Cl.² ............... G03B 17/24; G03B 19/12; G05D 25/00
[52] U.S. Cl. ..................... 354/106; 350/266; 354/155
[58] Field of Search ............... 354/105–109, 354/219, 222, 155; 353/38, 97; 350/172, 266, 268, 271, 272, 276 R, 276 SL, 280

[56] References Cited

U.S. PATENT DOCUMENTS

| 2,210,610 | 8/1950 | White | 354/105 |
| 3,037,419 | 6/1962 | Nixon | 350/276 R |
| 3,125,936 | 3/1964 | Abell | 352/93 X |
| 3,134,021 | 5/1964 | Ploke | 350/276 SL |
| 4,025,931 | 5/1977 | Taguchi et al. | 354/106 X |
| 4,099,189 | 7/1978 | Kuboshima | 354/106 |

FOREIGN PATENT DOCUMENTS

| 2708300 | 9/1977 | Fed. Rep. of Germany | 354/106 |
| 51-11042 | 1/1976 | Japan | 354/106 |
| 51-57436 | 5/1976 | Japan | 354/106 |

*Primary Examiner*—L. T. Hix
*Assistant Examiner*—Thomas H. Tarcza
*Attorney, Agent, or Firm*—Wolder, Gross & Yavner

[57] ABSTRACT

A camera is equipped with a member bearing data to be photographed such as a date and the like and a data light focusing optical system for projecting the illuminated data from the data member at the front of the camera rearwardly with the object light toward the data photographing portion of the film. The data light focusing optical system is arranged so that the data light is directed to be incident on the data photographing portion of the film from a direction different from the incident direction of the object light. Provided in the front of the data photographing portion of the film is an object light incidence limiting member which is positioned parallel with the plane of the film and allows the transmission of the data light therethrough but interrupts the object light directed toward the data light focusing portion of the film.

17 Claims, 22 Drawing Figures

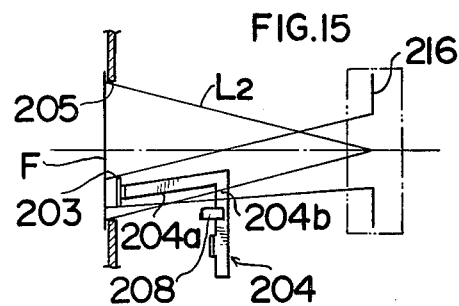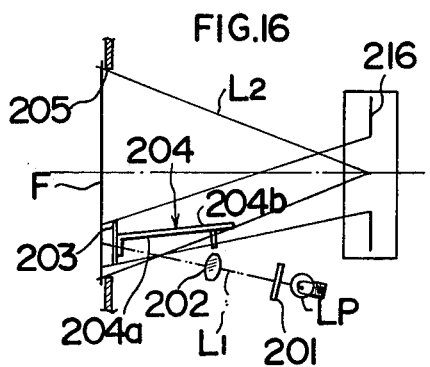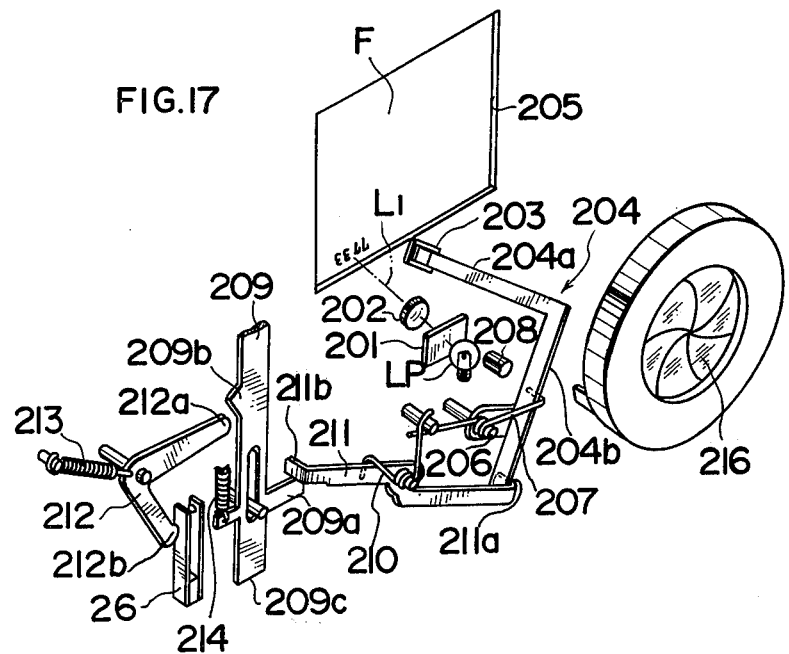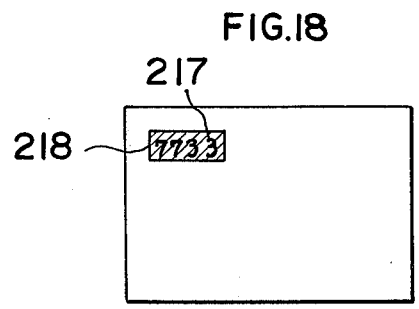

DATA PHOTOGRAPHIC DEVICE FOR CAMERA

BACKGROUND OF THE INVENTION

The present invention relates generally to improvements in cameras equipped with data photographing devices, and it relates more particularly to an improved camera which allows the recording of data such as a photographing date, exposure condition and the like.

A data photographing system is known, in which an image of an object and an image of data are photographed on a film in superimposed relation. In this respect, in case the object light is highly intense, then the contrast between the data image and the image of an object is low, so that the data is difficult to recognize and read or cannot be recognized or read at all. To cope with this, a system has been proposed, in which object light incident on the data photographing portion is blocked or shielded by a mask plate. According to this system, object light as well as data light are focused on a film from the same side, as described in the Japanese Utility Model Application. Laid-open No. 51-11042 issued on Jan. 27, 1976 or Patent Application Laid-open No. 51-57436 issued on May 19, 1976, and a mask member is provided in front of the data photographing portion of the film for blocking object light, and a mirror inclined to a film plate is provided on the back of the mask member, whereby the data light is reflected by the mirror so as to direct the light onto the film plane. However, this system suffers from the shortcoming in that when the mask member or plate is brought as close as possible to the film plane, the mask must be inclined at a very large angle to the film plane for directing the data light being incident in parallel with the film plane onto the film plane, while the distance of the mask plate to such a portion of the film plane, which is away from the mask plate, is greatly increased. Accordingly, an image of the mask plate is gradually blurred on the mask plate from its portion closer to the film plate towards its portion away from the film plane, so that the contrast of an image of the mask plate relative to the data image is lowered. For this reason, the data image is difficult to observe, with the resulting failure to obtain a desired fine picture.

SUMMARY OF THE INVENTION

It is an object of the present invention to provide a camera equipped with a data photographing device, which may photograph a shadow of a mask plate onto the film plane clearly and without being blurred, thereby providing a data image of good contrast.

According to one embodiment of the present invention, the mask plate is so designed as to be retractable from the front of the exposure plane by manual operation externally of the camera. In accordance with an embodiment of the invention, in case data is not to be photographed, the mask plate can be retracted from the front of the exposure plane so as to prevent the photographing of an undesired silhoutte of the mask plate, this allowing the photographing of the entire object.

Furthermore, according to another embodiment of the invention, as applied to a single lens reflex camera, an optical path deflecting element adapted to direct the data light alone to an eyepiece portion of a finder is provided in close vicinity to a focusing plate. According to the latter embodiment, there may be displayed in the field of the view finder a data image which is as clear as that of the data image projected onto the film plane.

BRIEF DESCRIPTION OF THE DRAWINGS

FIG. 15 is a side view of an embodiment of FIG. 14;

FIG. 16 is a plan view of the embodiment of FIG. 14;

FIG. 17 is a perspective view showing the shutter-release-completed condition of the embodiment of FIG. 14;

FIG. 18 is a view showing a picture image photographed by the camera shown in FIG. 14;

DESCRIPTION OF THE PREFERRED EMBODIMENTS

Figure 1:
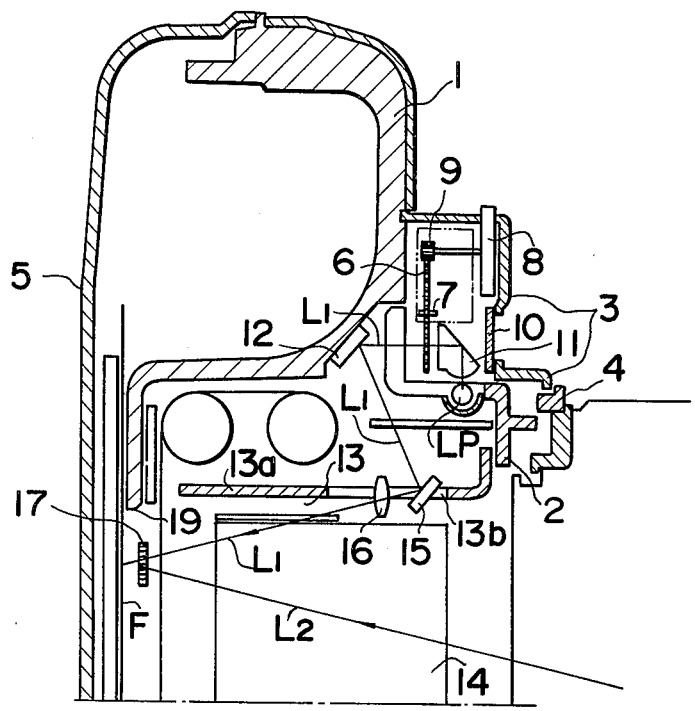
FIG. 1 is a fragmentary cross-sectional view of an essential part of a system in accordance with one embodiment of the invention.

Referring now to the drawings, particularly FIGS. 1 to 6 thereof which illustrate a preferred embodiment of the present invention, as applied to a single lens reflex camera, the improved camera includes a camera body 1, a front frame 2, a front cover 3, a diaphragm interlocking member 4 and a lid member 5 delineating a film chamber for housing a film they are assembled in a known manner. A data plate 6 is provided in the form of a rotary plate supported by a shaft 7, with data such as a date and the like to be photographed being carried on a common disc, and in addition, the plate 6 as well as a data setting member 8 are arranged in an internal space delineated by the front cover 3. A data setting member 8 consists of a manually operable rotary member, part of which projects through and is exposed at the side surface of cover 3, and brings selected desired data to a predetermined data photographing position in cooperation with the data carrying plate 6 by means of a gear 9.

The data in the data photographing position is illuminated by light from a lamp LP or by external light introduced through a prism 11 from a light transmitting window 10 provided in the front face of the cover 3.

The data in this respect is illuminated from the front of the data plate 6 by data light L1 transmitted through the plate 6 and then focused on the film F. Accordingly, the plate 6 may be transparent and carry opaque data thereon, or may be opaque and carry transparent data thereon. Furthermore, data plate 6 may be made of a reflecting material, so that illuminating light is reflected thereon so as to provide data light L1.

In the optical system for data photographing, in which data light L1 is to be focused on film F, the data light L1 from data plate 6 is incident on a first data mirror 12 provided on a front, inner corner portion of body 1 and reflected thereby to a second data mirror 15 provided in a window portion 13b in a side wall 13a of the mirror box, and is then reflected by mirror 15 through a data lens 16 provided in window portion 13b, and then through the mirror box 13 rearwardly from its front so as to be focused on the film F.

According to the present invention, data light L1 to be focuses on film F is deflected by the inclined first and second data mirror 12, 16 in a direction different from that of the object light L2 incident on the data photographing portion of film F, as shown in FIG. 1, while data light L1 passing through mirror box 13 is incident on part of the camera movable mirror 14 maintained in a condition prior to taking a picture, and then focused on a viewing or focusing plate (not shown) along with object light L2, thereby displaying data observable through the finder. In addition, data light L1 may be incident on film F along with object light L2 only when mirror 14 is retracted from the optical path of object light L2 upon photography.

Figure 3:
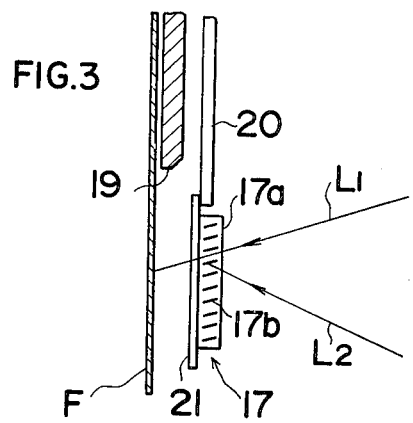
FIG. 3 is an enlarged cross-sectional view of an incident object light limiting member for use in the embodiments of FIGS. 1 and 2.
Figure 4:
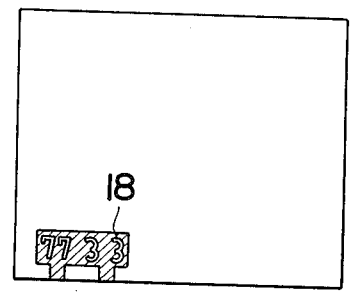
FIGS. 4 and 5 are elevational views of pictures photographed by the cameras shown in FIGS. 1 and 2, respectively.

An object light incidence limiting member 17 is provided in parallel with the film or exposure plane in front of the data photographing predetermined portion of film F, on which is incident data light L1. As shown in FIGS. 1 and 3, incident light limiting member 17 is of such construction that tranversely spaced light-absorbing, light-shielding sheets 17b having a thickness of about 10 microns are embedded or positioned within a transparent thin sheet member 17 of 0.5 to 0.6 mm thickness in parallel with the direction of data light L1 incident on film F. Incident light limiting member 17 allows the introduction of data light L1 to the data photographing portion of film F, and blocks and absorbs the object light L2 having a different incident direction, thereby preventing object light L2 from being incident on film F. As a result, the data photographing portion of film F is positioned in a manner masked by member 17 from object light L2, and is hence not at all exposed to object light L2. Accordingly, as shown in FIG. 4, a data image 17 of high contrast and resolution may be photographed on film F as effected only by the data light L1 incident thereon.

Figure 5:
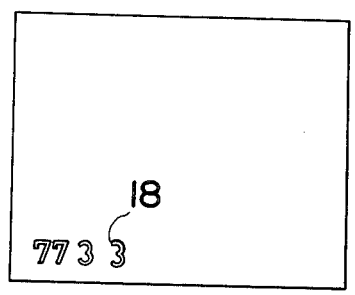

Object light incidence limiting member 17 is secured to a transparent base plate 21 provided at the end of a reciprocating or slide member 20 at the front of the picture frame 19, and normally positioned in front of the data photographing portion of film F by means of member 20 being biased by a spring 22, thereby blocking object light L2 from being incident on the data photographing portion of film F. Reciprocating member 20 is operated by a swingable operating member 23 having an operating portion 23a, one end engaging a first follower arm or portion 20a projecting from slide member 20. Operating member 23 is supported at its center on a shaft 24 and an operating portion of arm 23b at the other end of member 23 protrudes through the top face of the camera. When operating portion 23b assumes the position of index B in FIG. 2, operating portion 23a of operating member 23 is shifted to its end leftmost position in the direction of advance of reciprocating member 20 under the influence of spring 22 and reciprocating member 20 assumes its advanced position, positioning member 17 in the front of the data photographing portion of film F. When operating portion 23b assumes the position of index W in FIG. 2, the operating portion 23a is moved to the right from the position shown in FIG. 2, so as to retract the reciprocating member 20 by acting on follower portion 20a. The distance or extent the reciprocating member 20 is retracted, should be such as to retract limiting member 17 out of the picture frame 19, thereby allowing the projection of object light 12 onto the data photographing portion of film F, despite the provision of limiting member 17. Accordingly, as shown in FIG. 5, data image 18 may be photographed on the picture plane. In this case, the intensity of the object light affects the visibility of data image. However, the shadow or silhouette of limiting member 17 is not photographed on film, so that it is recommended that limiting member 17 be selectively used.

Figure 2:
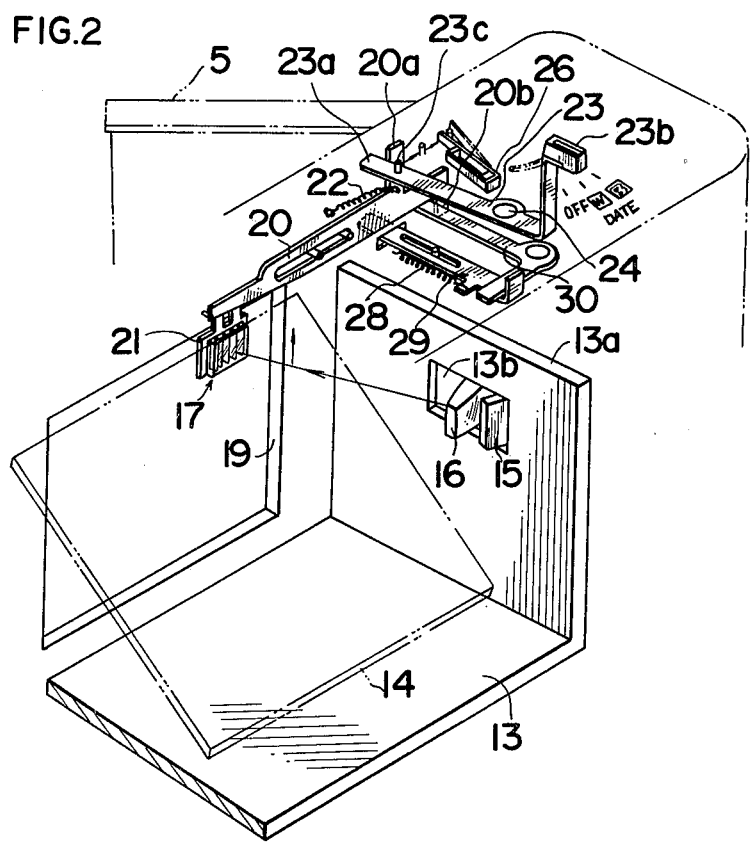
FIG. 2 is a perspective view of the embodiment of FIG. 1.
Figure 6:
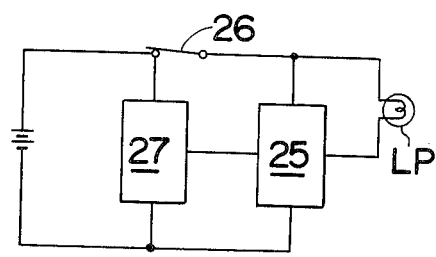
FIG. 6 is a circuit diagram of a network for use in the data photographing device of the present invention.

Furthermore, when operating portion 23b assumes the OFF position in FIG. 2, operating portion 23a of operating member 23 is moved further to the right along with reciprocating member 20, so that a main switch 26 in a data circuit 25 shown in FIG. 6 is turned off as shown by a phantom line in FIG. 2, by means of a pin 23c mounted on operation portion 23a. When main switch 26 is turned on, as shown in FIG. 6, data circuit 25 energizes and lights the lamp LP in response to a shutter closing signal and the like, while turning off the lamp by means of a RC circuit or the like, thereby allowing lamp LP to light only at a suitable timing or interval upon each photograph for permitting data photographing. However, the data circuit 25 will not energize or turn on lamp LP due to its disabled or inoperable condition caused by main switch 26 being turned off. Accordingly, data photographing will not be effected by lamp LP. In this case, if lighting window 10 is maintained opened, then data may be photographed by the incident light therethrough. On the other hand, when lighting window 10 is closed by a light shielding lid (not shown), no data photographing at all will occur.

A force acts on a second follower or passive portion 20b of reciprocating member 20 so as to bias it to the right in a retracting direction by means of an intermediate bell lever 30 engaged by a slide plate 29 which is loaded by a spring 28 stronger than a spring 22 in a manner that slide member 29 may protrude through the side of the back of the camera. When lid member 5 is closed, slide plate 29 is retracted against the action of spring 28 by means of lid 5, thereby allowing the free advancing movement of reciprocating member 20 under the influence of spring 22. However, when lid 5 is opened as shown by a phantom line in FIG. 2, slide plate 29 is shifted to its protruding position through the side of the back of a camera under the action of spring 28 by being released from the restriction of lid 5, thereby forcibly retracting member 20 through the medium of intermediate lever 30 against the action of spring 22, even if reciprocating member 20 remains in its advanced position as shown in FIG. 2, so that the limiting member 17 is retracted out of picture frame 19. Accordingly, the danger of limiting member 17 being pushed by a finger or the like, when positioned within picture frame 19, and lid 5 is brought to its open position is avoided.

While reciprocating member 20 is shown as formed separately of transparent base plate 21, as an alternative, reciprocating member 20 may be formed integrally with transparent plate 21, which is made of plastic. Moreover, member 17 may be formed into a light shielding plate 17b of a small size by raising a flat sheet.

Figure 7:
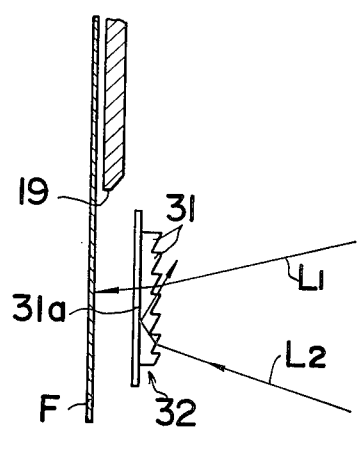
FIGS. 7 and 8 are enlarged cross-sectional views showing modifications of the object light incidence limiting member, respectively.

FIG. 7 shows an embodiment of the present invention wherein the object light incidence limiting member 32 formed of prisms 31 of triangular cross-section is constructed so as to form a prismatic serrated or corrugated surface and positioned in the front of the data photographing portion of film F. Data light L1 is refracted by prisms 31 and focused on film F by passing through limiting member 32, while object light L2 is directed toward the data photographing portion of film F is so incident on the interface or emitting surface 31a at an angle of incidence exceeding the critical angle so as to be fully reflected whereby object light L2 incident on member 32 does not reach the film at all. Accordingly data light L1 whose angle of incidence on interface 31a does not exceed the critical angle alone is incident on film F.

Figure 8:
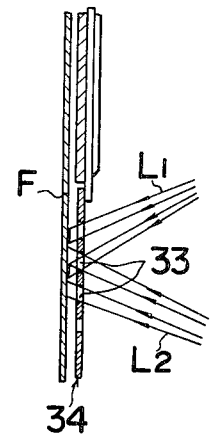

FIG. 8 shows an embodiment of the invention in which a lattice plate having slits 33 therein is used as an object light incidence limiting member 34. Data light L1 and object light L2 both pass through slits 33 provided in member 34 onto film F to be photographed in a stripe pattern. However, due to the difference in their directions of incidence, data and object light L1 and L2 are incident on different areas of the film, on respective alternate stripes, so that data image may be photographed on film, separately of the object light L2.

Figure 9:
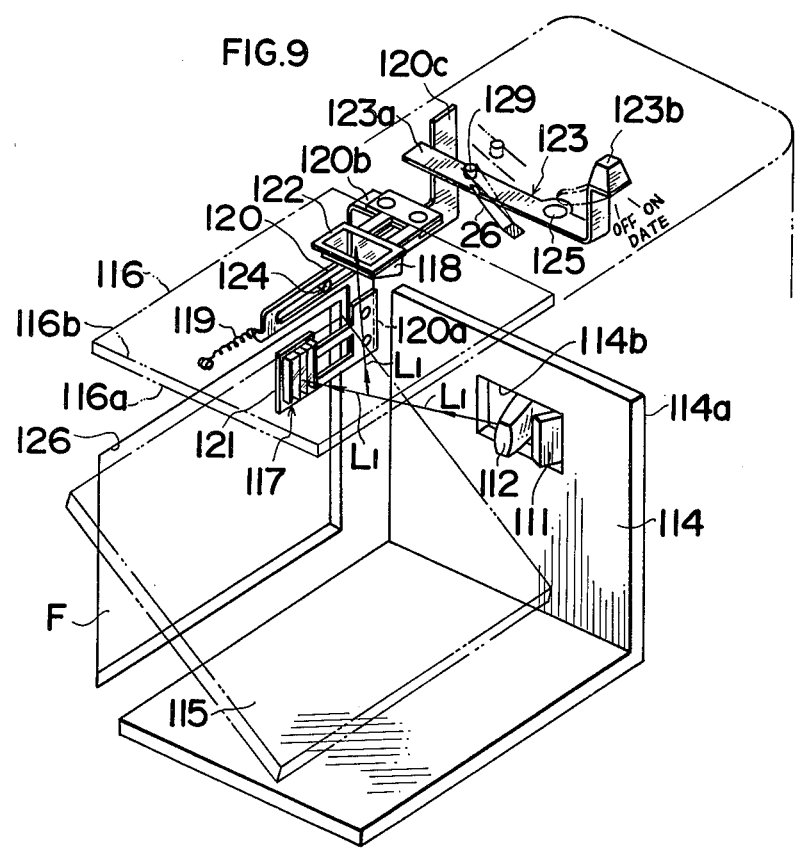
FIG. 9 is a perspective view similar to FIG. 2 of another embodiment of the present invention.

FIG. 9 shows another embodiment of the invention in which when a movable camera mirror 115 within a mirror box 114 is in a non-picture-taking condition, the data light L1, along with the object light, is reflected by movable mirror 115 so as to be incident on a focusing plate 116 to be focused on the focusing plate focusing plane 116a. The data light L1 and object light L2 projected on focusing plate 116 maintain the same positional relationship as the case where they are incident on film F, the incident angles thereof being different from each other.

Figure 10:
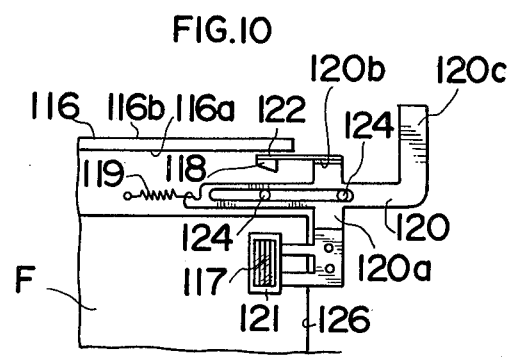
FIG. 10 is a front view of only an essential part of the embodiment of FIG. 9.
Figure 11:
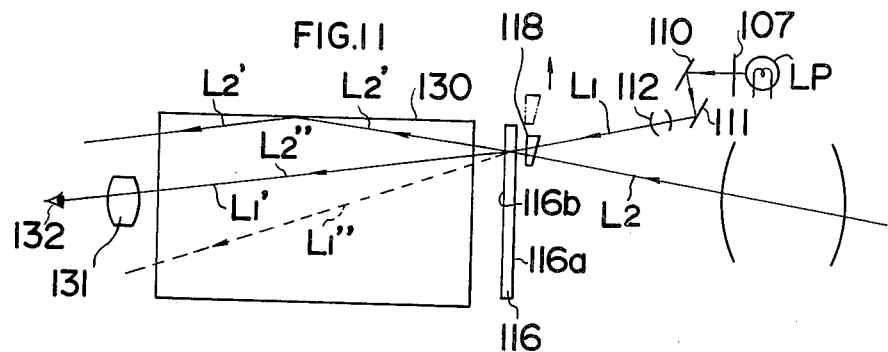
FIG. 11 is a view showing an outline of a finder-optical system in the embodiment of FIG. 9.
Figure 12:
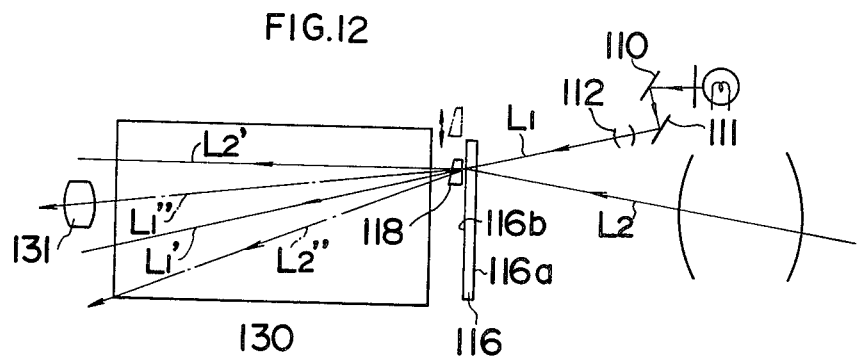
FIG. 12 is a view showing an outline of a modification of the finder-optical system.

A light shielding member 117 is provided immediately in front of the picture frame 126 of the camera in front of or in registry with the data photographing portion of film F in parallel with the film F. In this respect, light shielding member 117 is so designed as to block the introduction of object light onto the data photographing portion of film F and allows the passing only of data light L1 by utilizing the difference in incident angle. A light deflecting member 118 adapted to direct only data light L1 into the field of the view finder and object light L2 out of the field of the view finder is provided in the optical path of the data light L1 on the side of a focusing plate 116a as shown in FIGS. 10 and 11, or on the side of a Fresnel plate 116b as shown in FIG. 12, with respect to focusing plate 116. The members 117 and 118 are secured to arms 120a and 120b respectively of a single reciprocating member 120 which is loaded so as to be biased to the left in FIG. 9 under the action of a spring 119 so as to enter into the optical path of data light L1 at all times. Light shielding member 117 is the same as member 17 shown in FIG. 3, and is mounted on a transparent base plate 121 which in turn is secured to an arm 120a of reciprocating member 120. A light deflecting refractor member 118 is of a wedge-shaped cross section and secured to a transparent base plate 122 which in turn is secured to arm 120b of reciprocating member 120. Base plates 121, 122 may be integrally formed with reciprocating member 120.

Reciprocating member 120 includes at its right end an upwardly directed follower arm 120c which engages an operating end 123a of data photographing change-over lever 123. Lever 123 is pivotally movable by means of an operating button 123b exposed at the top face of the camera. Shown at 124 is a guide pin engaging a slot in reciprocating member 120, and at 125 a pivot for swingably supporting lever 123.

A control circuit for controlling the energization of illuminating lamp LP is similar to that shown in FIG. 6. The main switch 26 of the control circuit, as shown in FIG. 9, is engaged and actuated by an operating pin 129 on change-over lever 123, and is so designed and related as to be closed when reciprocating member 120 is at its advanced position.

Shown at 130 and 131 in FIGS. 11 and 12 are respectively a penta-roof prism and an eyepiece in the finder optical system. In this respect, the penta-roof prism 130 is shown in a developed view for convenience.

FIGS. 9 and 10 show the camera data photographing condition, wherein operating button 123b assumes the position at index ON in FIG. 9, and change-over lever 123 is in its counterclockwise position, and reciprocating member 120 is in its advanced position under the influence of spring 119. Accordingly, light shielding member 117 and optical path deflecting member 118 are positioned in the optical path of data light L1 and main switch 26 remains closed.

Prior to a shutter releasing operation in the aforesaid condition, the desired data on data carrying member 107 which assumes a photographing position is illuminated by external light through lighting window 10 as earlier described, although lamp LP is extinguished so that the data light L1, along with the object light L2, is directed by the camera movable mirror 115 to a focusing plate 116 in the finder optical system. Data light L1 incident on focusing plate 116 is different in incidence angle from object light L2, so that the optical paths of both lights L1 and L2 are deflected through penta-roof prism 130, as shown by L1' and L2' in FIG. 11, in a manner that the main light is directed out of the field of the view finder, while diffusion light L2" from focusing plate 116 alone is incident on eyepiece 131 and pupil 132. In contrast, the data light L1 is deflected through penta-roof prism 130 so as to be introduced into the field of the view finder as shown by L1' in FIG. 11, and is then incident on eyepiece 131 and pupil 132, along with diffusion light L2" of the object light.

For this reason, part of the object image becomes a shadow of member 118 in the field of the view finder due to the vignetting of object light L2 by means of optical path deflecting member 118. Thus, data image is clearly viewed in good contrast in the aforenoted shadow portion.

The position of the shadow portion of member 118 relative to the object image corresponds to the data photographing position of film F, on which data light L1 is incident, and hence a field image equivalent to the data photographing picture plane may be achieved.

The condition of the photographed data and the condition of the object image are confirmed by means of a field image, and when these are observed as being optimum, the shutter is released. Upon releasing of the shutter, movable mirror 115 is retracted from the optical path of object light L2, and data light L1 and object light L2 may advance along a line towards the film plane unhindered by movable mirror 115. On the other hand, a CR circuit 25 in FIG. 6 is actuated in synchronism with the operation of the shutter, thereby lighting lamp LP for a predetermined interval. Object light L2 and data light L1 whose intensity is increased by the light from lamp LP are directed toward film F due to the opening operation of the shutter. However, object light L2 is absorbed and blocked by light shielding member 117, and hence not incident on the data photographing portion of film F, but data light L1 alone is incident on the film data photographing portion through member 117. Accordingly, the data photographing portion of film F becomes a clear shadow portion of member 117 due to the vignetting of object light L2 by means of light shielding member 117 which is positioned close to film F in parallel therewith. As a result, data is photographed with good contrast in the shadow portion. A picture image equivalent to the image in the view finder is achieved.

As shown in FIG. 12, in case optical path deflecting member 118 is positioned on the side of Fresnel plane 116b of focusing plate 116, data light L1 and object light L2 to be focused on the data light focusing portion of focusing plate 116 are incident in such a manner that main light beams L1' and L2' thereof and the diffusion light L2" of the object light L2 are not incident on pupil 132, while diffusion light L1" of data light L1 alone are incident on pupil 132. Accordingly, the contrast of data image in the field of the view finder is lowered, and not improved as compared with the contrast thereof on the picture image plane.

In case the data is not to be photographed, operating button 123a of change-over lever 123 is shifted to the OFF position index as shown in FIG. 9. This swings the lever 123 clockwise, thereby retracting the reciprocating member 120 to the right against the influence of a spring 119, so that light shielding member 117 and optical path deflecting member 118 are both moved out of the optical paths of data light L1 and object light L2. On the other hand, main switch 26 is opened by operating pin 129 so that lamp LP will not be energized. In addition, by closing lighting window 10 or setting data display member 6 in a non-data-photographing condition, data light L1 is not incident on the film.

As a consequence, the data image is not observable in the field of the view finder, nor photographed on film F. In addition, because of freedom of vignetting by light shielding member 117 and optical path deflecting member 118, the entire area of the object image may be photographed on film at the picture taking plane and an image similar thereto may be viewed in the field of the view finder. Meanwhile, lamp LP is extinguished at the time other than data photography, so that electric power may accordingly be saved.

Light shielding member 117 may be replaced by a member shown in FIG. 7 or 8. As an alternative, optical path deflecting member 118 may be such as to cause the object light to be directed off the field of the view finder, or may be a member such as light shielding member 117, thereby blocking the object light L2 directed toward the pupil 132. In case a light shielding member is provided on the aforenote slit type, even in case an optical path deflecting member of the microprism type is employed, the condition of the data image in the picture taking plane may be brought into coincidence with that viewed in the field of the view finder.

Figure 13:
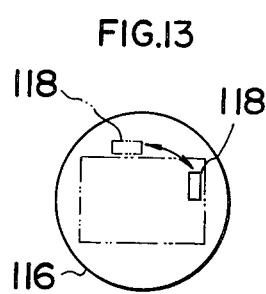
FIG. 13 is a bottom view of a modification of the optical path deflecting element.

Moreover, the light shielding member 117 may be supported separately of optical path deflecting member 118 so as to be moved back and forth by means of a common member. In this case, optical path deflecting member 118 may be formed integrally with focusing plate 116 which is swingable as shown in FIG. 13 so that the optical path deflecting member 118 may be moved into or out of the finder optical path. Alternatively, lamp LP may be manually lit or extinguished manually, as required, or in mechanical cooperation with the operation of the shutter drive or with the opening and closing operation of the shutter.

According to the embodiments shown in FIGS. 9 to 13, data image may be clearly obtained at the same position and condition both in the picture taking plane and in the field of the view finder. In addition, when data is not photographed, there is no trace of vignetting of the object image, so that the normal photographing condition may be retained, and the quality of photography improved, and there may be avoided such troubles as any inconvenience or mistake in photography due to the lack of matching between the field image in the view finder and the image on the picture taking plane. In addition, a member to improve the sharpness of the data image on the picture taking plane and on the field of the view finder is moved back and forth by a single member allowing change-over in response to the need to photograph the data, so that the camera may be operated with ease, with the accompanying freedom from mistakes due to erroneous operation.

FIGS. 14 to 17 illustrate a lens shutter type camera with the present system in which data carried by a data member 201 is illuminated by a lamp LP, so that light from member 201 serves as data light L1. Data light L1 is focused on the data photographing portion of film F through data lens 202. A light shielding mask plate 203 to block the incidence of object light L2 on the data photographing portion is provided in the front of the data photographing portion.

A supporting member 204 includes an arm 204a, whose free end is coupled to the front surface of a mask plate 203 on the side of the incident object light, and which extends to an out-of-focus position towards the front of the camera; and a leg 204b supported and extending from the root of arm 204a outwardly of the picture frame 205 of a camera i.e., out of the path of object light L2 which is incident on the picture frame 205. Arm 204a and leg 204b of mask plate 203 are integrally formed and longitudinally coplanar. In addition, the end bent portion of arm 204a is secured to the front surface of mask plate 203.

Figure 14:
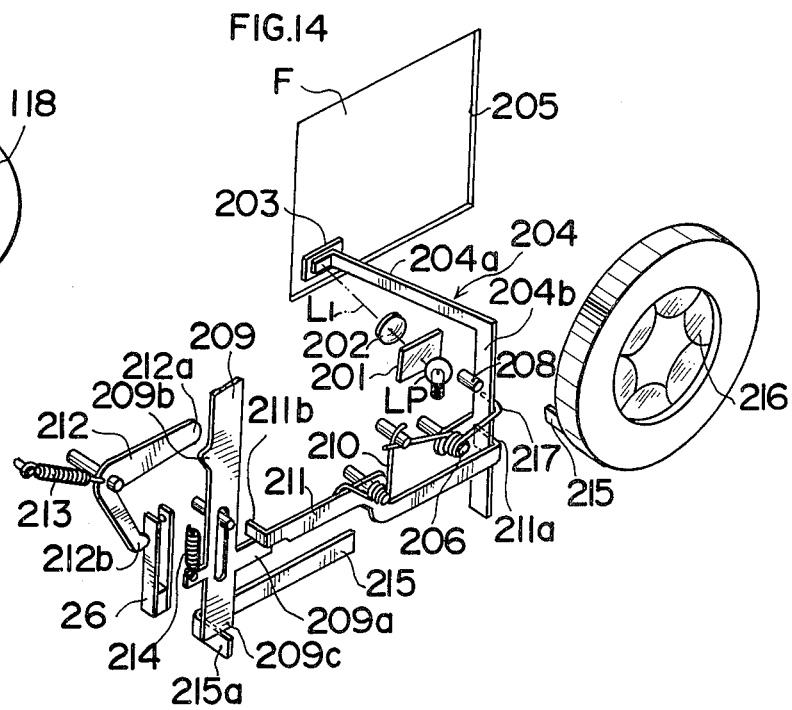
FIG. 14 is a perspective view showing only the data photographing device in a lens shutter camera.

Data light L1 is so directed as to be incident on film F from the front of a camera, like object light L2. Supporting member 204 is swingably supported by a pin 206 and is so biased by a spring 207 as to rotate counterclockwise, and positions mask plate 203 in the front of the data photographing portion of film F, as shown in FIGS. 14 to 16, when member 204 abuts a stopper pin 208. On the other hand, a mask plate driving lever 211 adapted to follow a shutter release member 209 under the influence of a spring 210 is provided with one end 211b which engages a first operating projecting piece 209a of release member 209. In this respect, the lever 211 remains in the position assumed when rotated clockwise against the action of spring 210, prior to the release of the shutter, and the other end bent piece 211a of lever 211, as shown in FIG. 17, holds supporting member 204 in the position assumed when rotated clockwise against the action of spring 207 from the locked position against pin 208. As a result, supporting member 204 maintains mask plate 203 out of registry with picture frame 205 as shown in FIG. 17. In addition, a switch driving lever 212 provided along the side of shutter release member 209 is positioned in the path of movement of a second operating projecting piece 209b of release member 209, and maintained in a neutral position facing a data photographing trigger switch S. Lever 212 pushes switch S by means of operating end 212b to close switch S only when rotated counterclockwise.

When a shutter button (not shown) is depressed in the condition prior to a shutter releasing operation as shown in FIG. 17, then shutter release member 209 is lowered against the influence of a spring 214. Mask plate driving lever 211 rotates counterclockwise, following the downward movement of shutter release member 209 under the action of a spring 210 to release supporting member 204 from bent piece 211a so as to return supporting member 204 in a direction urged by spring 207, i.e., counterclockwise. As shown in FIG. 14, immediately before the shutter releasing operation, supporting member 204 abuts stop pin 208 so as to position mask plate 203 in the front of the data photographing portion of film F. In the aforenoted course, the follower end 212a of switch driving lever 212 is depressed by means of the second operating projecting piece 209b of shutter release member 209 so as to be rotated clockwise against the action of spring 213, whereby operating end 212b is moved in the direction away from the trigger switch S so that switch S is opened. Immediately before the shutter releasing operation, shutter release member 209 reaches the same position assumed when the shutter releasing operation has been completed, while the second operating projecting piece 209b departs from the follower end 212a of switch driving lever 212, so that lever 212 is returned to its neutral position.

When shutter release member 209 is further depressed, then member 209 pushes follower piece 215a of shutter release lever 215 by means of the lower end 209c of member 209, so that lever 215 releases the shutter 216. Accordingly, as shown in FIG 14, shutter 216 is opened so as to allow the exposure of film by object light L2. However, the data photographing portion of film F will not be exposed because mask plate 203 is positioned in the front of the data photographing portion. Arm 204b of supporting member 204 is positioned in the optical path of object light L2, while leg 204b remains in the out-of-focus position and is not photographed on film F, while the shadow of arm 204a will not be photographed since it is concealed by mask plate 203. Particularly, a shadow of such a portion of arm 204a which is close to the mask plate 203 is clear. However, the shadow of arm 204a is concealed by mask plate 203. However, the shadow of the arm 204a is dimmed, when departing a given distance, so that even if arm 204a is not accurately parallel with object light L2, the shadow of arm 204a is not photographed on film F, as far as arm 204a extends towards the front of a camera. In short, the shadow of mask plate 203 alone is photographed on film F.

When shutter release member 209 is moved upwards under the action of spring 214, after the completion of exposure, then mask plate driving lever 211 is rotated clockwise against the influence of spring 214 as the initial phase of operation, and then driving lever 211 rotates supporting member 204 clockwise against the action of spring 207 by means of bent piece 211a. Accordingly, mask plate 203 is retracted out of registry with picture frame 205 as shown in FIG. 17. In response to the subsequent upward movement of shutter release member 209, follower end 212a of switch driving lever 212 is moved upwards by the second operating projecting piece 209b of release member 209 and thus rotated counterclockwise, so that operating end 212b thereof closes trigger switch S. When switch S is closed, lamp LP is lit, so that data in the photographing position on data display member 201 is photographed through a data lens 202 on the data photographing portion which is devoid of the shadow of the mask plate. FIG. 18 shows a picture. Shown at 217 is a data image, and at 218 is a shadow of mask plate.

When shutter release member 209 is further moved upwards and second operating projecting piece 209b leaves the follower end 212a of switch driving lever 212, then lever 212 is returned to its neutral position under the action of spring 213, and switch S is returned to its open position.

Figure 19:
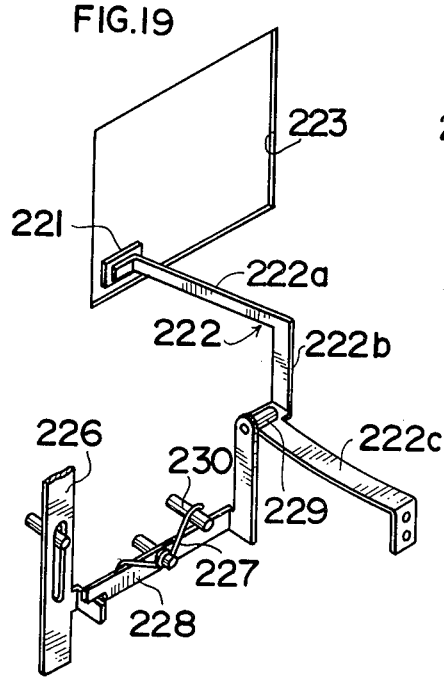
FIG. 19 is a perspective view of a modification of the embodiment of FIG. 14.
Figure 20:
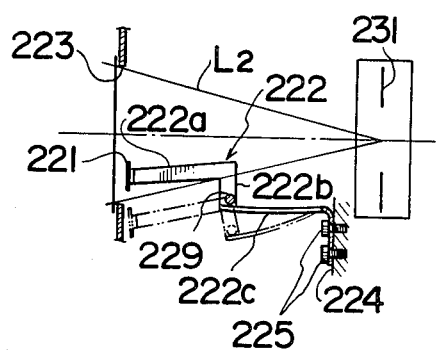
FIG. 20 is a side view of the system of FIG. 19.

FIGS. 19 and 20 show other cameras equipped with data photographing means. A supporting member 222 of mask plate 221 is made of a spring material and formed with: an arm 222a parallel with the object light L2; a leg 222b extending externally of the picture frame 223 from its root portion; and an attaching arm or piece 222c extending from the root portion of leg 222b towards the front of the camera. Arm 222a and leg 222b are coplanar in the longitudinal direction, while the plane of attaching piece 222c is directed laterally. In this respect, the root portion of attaching piece 222c is secured to a stationary wall 224 by means of screws 225. A mask plate angular driving lever 228 adapted to follow a shutter release member 226 under the action of a spring 227 has an operating pin 229 at one end, which engages the end of attaching piece 222c of supporting member 222, whereby the supporting member follows pin 229 under the resilient force of attaching piece 222c. As a result, supporting member 222 cooperates with shutter release member 226 through the medium of lever 228, thereby moving mask plate 221 in and out of picture frame 223 as in the preceding embodiment. Shown at 230 is a stop pin adapted to limit the counterclockwise rotation of lever 228, and pin 230 serves to maintain the constant stopped position of mask plate 221 within picture frame 223. Shown at 231 is the camera shutter.

In the cameras shown in FIGS. 14 to 20, the beams of object light directed toward the focal plane data image area are blocked by means of a mask plate. However, in case the object light is blocked with a blue filter, and the data is illuminated by a lamp which emits orange color light, then the data photographed may be more clearly visible in the case of a color print. In this case, the arm of the supporting member is so designed as to extend from the side edge of the mask so as to eliminate the influence of the supporting member. In addition, in case the mask plate is so constructed as to block the object light alone, by utilizing the difference in direction of the data light and object light which are incident on the data photographing portion, or in case the data light is incident thereon from the opposite direction of the object light, i.e., a back incident system is adopted, then the mask plate need not be retracted. In case the mask plate is so designed as to be retracted, the supporting member is retracted, and need not cooperate with the shutter release member Alternatively, the entire or part of the supporting member may be made of a wire, so that the influence of the shadow of the supporting member may be greatly minimized. The wire for use as a supporting member may be made of steel and should only be about 0.8 mm in diameter.

Figure 21:
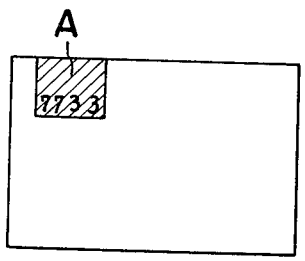
FIGS. 21 and 22 are views showing pictures photographed by a lens-shutter camera equipped with a known type date photographing device.
Figure 22:
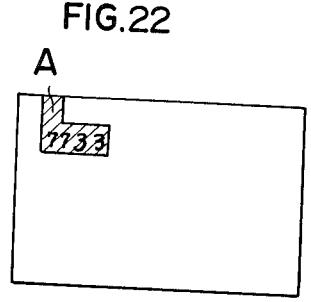

In the printing operation of a picture, consideration is not given to the printing range of the film picture plane, and hence the respective sides of the film picture plane are not cut to specific dimensions. For this reason, the data photographing position is sufficiently disposed internally of the film picture plane so as to preclude any danger of the data being cut off. Accordingly, in case the light shielding plate is provided in the front of the data photographing portion of film, the light shielding plate need face towards the front of the data photographing portion inwards of the picture frame of the camera. However, since a coupling mechanism including the mask plate and mask-plate-supporting member positioned out of the picture frame is such that one of the mask plates and supporting member is so constructed as to extend in the opposite direction in parallel with the film plane, the object light is blocked for portions other than the data photographing portion of the picture plane of the film due to the contour of the aforenoted extended portion, with the result that there is obtained a mask image A including an image of the supporting member as shown in FIGS. 21 and 22. In the case of printing of a picture, it sometimes happens that depending on the printing range, such a portion of a mask image, i.e., a portion of the image of the supporting member appears on the printing picture area, thereby reducing the aesthetic quality of the printed picture area. In addition, when the aforenoted extended portion appears on the picture area, it is frequently undesirable.

With the cameras equipped with the data photographing systems as shown in FIGS. 14 to 20, the shadow of the supporting member for the mask plate is not photographed on the film, even in case the data photographing position is sufficiently internally of the picture area so as to preclude any danger of the data image being cut off, the light shielded image of object light may be photographed only in the desired range of the data photographing portion, thereby improving the contrast of the data image and the aesthetic value of the picture.

While there have been described and illustrated preferred embodiments of the present invention it is apparent that numerous alterations, omissions and additions may be made without departing from the spirit thereof.

We claim:

1. In a camera including a camera body having a focal plane and an objective lens having an optical axis perpendicular to said focal plane:
   means for producing illuminated data;
   light projector means for directing and focusing an image of said illuminated data onto said focal plane along an optical axis which is at a predetermined angle to said objective lens optical axis; and
   an object light incidence intercepting means intercepting the light path of said projected image and positioned substantially parallel to said focal plane and including a plurality of side by side elements arranged such that each of them allows the passage therethrough of said data image light from said projector means to said focal plane, but intercepts the passage of said object light directed toward that portion of said focal plane on which said data image is projected.

2. A camera as set forth in claim 1, wherein said camera further comprises supporting means for supporting said object light incidence intercepting means and movable between a first position where said object light incidence intercepting means is brought into registry with said focal plane, and a second position wherein said object light incidence intercepting means is out of registry with said focal plane, said supporting means being manually operable from externally of said camera.

3. A camera as set forth in claim 2, wherein said illuminated producing means includes a data member carrying thereon data to be projected and a light emitting element illuminating said data member; and comprising an electric power source connected to said light emitting element and a switch connected between said electric power source and light emitting element, and being provided in the path of movement of said supporting means, said switch being released so as to interrupt the power supply to said light source when said supporting means is moved to said second position.

4. A camera as set forth in claim 3, wherein the body of said camera includes a lid member delineating a film chamber for housing a film therein, said lid member being movable for opening or closing said film chamber; and said supporting means includes a reciprocating member supporting said object light incidence intercepting means and movable between a first position where said object light incidence intercepting means is positioned in the front of said focal plane, and a second position where said intercepting means is retracted from the front of said focal plane, and a manually operable control member accessible externally of said camera coupled to said reciprocating member so as to move said reciprocating member in response to the movement of said control member; and said camera further comprises a detecting member movable in response to the opening and closing of said lid member, and an intermediate member for moving said reciprocating member from its first position to its second position, when said detecting member is moved due to said lid member being moved for opening said film chamber.

5. A camera as set forth in claim 2, wherein said supporting means is movable from said second position to a third position in which said object light incidence intercepting means is retracted further from said focal plane; said illuminated data producing means includes a data member carrying thereon data to be photographed and a light emitting element illuminating said data member; said camera includes an electric power source connected to said light emitting element and switch connected between said electric power source and said light emitting element and located in the path of movement of said supporting means and interrupting the power source to said light emitting element, by being opened only when said supporting means is in said third position.

6. A camera as set forth in claim 1, wherein said camera further comprises; a mirror positioned between said objective lens and said focal plane and movable between an operating position to reflect object light and data image light in a given direction, and a rest position to allow the passage of said object light and data image light to said focal plane; an eye piece; a focusing plate provided on the reflecting optical path of said reflecting mirror; a finder directing an image focused on said focusing plate to said eyepiece; and an optical path deflecting means positioned on the projected data optical path leading from said mirror and in the close vicinity of said focusing plate, said optical path deflecting means being adapted to direct data light reflected by said mirror into the finder optical path, and direct object light reflected by said reflecting mirror out of said finder optical path.

7. A camera as set forth in claim 6, wherein said camera further comprises: control means supporting said object light incidence intercepting means and said optical path deflecting means, and movable between a first position where said object light incidence limiting member is brought to the front of said focal plane and said optical path deflecting means is positioned in the optical path of light reflected from said mirror, and a second position where said object light incidence intercepting means is retracted from the front of said focal plane and said optical path deflecting means is retracted from said reflected object light optical path, said control means being manually operable from externally of said camera.

8. A camera as set forth in claim 7, wherein said illuminated data producing means includes a data member carrying thereon data to be photographed, and a light emitting element illuminating said data member, said camera further including an electric power source connected to said light emitting element and switch connected between said electric power source and said light emitting element, said switch being located in the path of movement of said control means, and interrupting the power source to said light emitting element by being opened only when said control means is moved to said second position.

9. A camera as seth forth in claim 1, wherein said object light incidence intercepting means is a transparent plate member embedding therein light shielding pieces which are arranged in parallel with the incident direction of said data light, said light shielding pieces being thin and light absorbing.

10. A camera as set forth in claim 1, wherein said object light incidence intercepting means comprises a transparent plate having a serrated surface.

11. A camera as set forth in claim 1, wherein said object light incidence intercepting means comprising a lattice form plate member having two or more parallel slits therein.

12. In a camera including a focal plane and an objective lens focusing object light rearwardly onto said focal plane, means for projecting illuminated data image rearwardly onto a predetermined portion of said focal plane along a direction incident on said predetermined portion different from the angle of incidence of said object light toward said predetermined portion and light intercepting means disposed forwardly of and registering with said predetermined portion and in the path of said object and data image light directed toward said predetermined portion and including a plurality of side by side narrow elongated sections each of which has a light transmissivity responsive to the direction of incidence of the light incident thereon, Whereby to permit the passage therethrough of said data image light and blocks the passage of said object light.

13. The camera of claim 12 wherein said light intercepting means comprises a differential masking plate member parallel to and proximate said focal plane and having a high light transmissivity of light incident thereon along the direction of said data image light and a low light transmissivity of light incident thereon along the direction of said object light.

14. The camera of claim 12 wherein said light intercepting means comprises a plate member parallel to and proximate said focal plane and having alternate high and low light transmission parallel stripes to effect the incidence of said object and data image light onto alternate stripe areas of said predetermined portions.

15. The camera of claim 12 including means for alternatively positioning said light intercepting mean in and out of registry with said predetermined portion.

16. The camera of claim 12 wherein said data projecting means comprises a data carrying member, means for illuminating at least a portion of said data carrying member and means for focusing an image of said illuminated data onto said predetermined portion.

17. The camera of claim 12 including means for externally manually adjusting said data carrying member to project selected data onto said predetermined portion.

* * * * *